US012084284B2

United States Patent
Janzen

(10) Patent No.: US 12,084,284 B2
(45) Date of Patent: Sep. 10, 2024

(54) TRANSPORT BAG FOR SUSPENDED TRANSPORT OF MATERIAL TO BE CONVEYED, AND LOADING STATION AND CONVEYOR SYSTEM FOR THESE TRANSPORT BAGS

(71) Applicant: SSI Schäfer Automation GmbH (AT), Graz (AT)

(72) Inventor: Paul Janzen, Bielefeld (DE)

(73) Assignee: SSI Schäfer Automation GmbH (AT), Graz (AT)

( * ) Notice: Subject to any disclaimer, the term of this patent is extended or adjusted under 35 U.S.C. 154(b) by 0 days.

(21) Appl. No.: 18/565,262

(22) PCT Filed: May 30, 2022

(86) PCT No.: PCT/EP2022/064644
§ 371 (c)(1),
(2) Date: Nov. 29, 2023

(87) PCT Pub. No.: WO2022/253772
PCT Pub. Date: Dec. 8, 2022

(65) Prior Publication Data
US 2024/0262631 A1 Aug. 8, 2024

(30) Foreign Application Priority Data
Jun. 2, 2021 (DE) .................. 10 2021 002 833.3

(51) Int. Cl.
*B65G 17/20* (2006.01)
*B65G 17/32* (2006.01)
(52) U.S. Cl.
CPC ............ *B65G 17/20* (2013.01); *B65G 17/32* (2013.01); *B65G 2201/0238* (2013.01)
(58) Field of Classification Search
CPC . B65G 17/20; B65G 17/32; B65G 2201/0238
(Continued)

(56) References Cited

U.S. PATENT DOCUMENTS 4,372,009 A * 2/1983 Linville ............... B65G 47/61
452/183
5,450,942 A * 9/1995 Johann ................ B65G 47/268
198/465.4
(Continued)

FOREIGN PATENT DOCUMENTS

AT 522067 A4 8/2020
DE 102011101987 A1 11/2012
(Continued)

OTHER PUBLICATIONS

US 2018/0086563 A1, Janzen et al., Mar. 29 (Year: 2018).*
(Continued)

*Primary Examiner* — Douglas A Hess
(74) *Attorney, Agent, or Firm* — Jason H. Vick; Womble Bond Dickinson (US) LLP

(57) ABSTRACT

The invention relates to a transport bag (28) having a roll running gear (1) which comprises only one pair of rolls (3) on which it is oscillatingly mounted in the transport rail (33). The upper coupling (2) of the transport bag (28) is located above the rolls (3) and enables driving and transport by means of a conveying element (29) which preferably has a commercially available roller chain having driver pins. The disengagement of the drivers and the upper coupling parts (2) is prevented by the design of the transport bag (28) in that the transport bag (28) generates a sufficient torque (M1) around the roll axis (4), and the permissible inclination of the upper coupling (2) relative to the vertical (36) during transport along conveyor paths is not exceeded, so that more reliable entrainment of the transport bag (28) is guaranteed. The curved-angle track switches (80) for the conveyor system have few parts and are therefore cost-effective and operationally reliable.

13 Claims, 11 Drawing Sheets

(58) Field of Classification Search
USPC .................................................. 198/678.1
See application file for complete search history.

(56) References Cited

U.S. PATENT DOCUMENTS

| | | | | |
|---|---|---|---|---|
| 5,480,020 | A * | 1/1996 | Schneuing | B65G 47/61 198/465.4 |
| 5,975,279 | A * | 11/1999 | Blattner | B65G 47/61 198/465.4 |
| 6,125,991 | A * | 10/2000 | Veldkamp | A22C 15/001 198/678.1 |
| 8,607,963 | B2 * | 12/2013 | Wend | B65G 19/025 198/474.1 |
| 8,672,118 | B2 * | 3/2014 | Janzen | B65G 47/61 198/680 |
| 8,757,354 | B2 * | 6/2014 | Hazenbroek | B65G 17/20 198/465.4 |
| 9,187,252 | B2 * | 11/2015 | Wend | B65G 17/12 |
| 10,875,716 | B2 * | 12/2020 | Schönenberger | B65G 9/002 |
| 10,954,079 | B2 * | 3/2021 | Ramseier | B65G 47/61 |
| 11,299,350 | B2 * | 4/2022 | Fenile | B65G 9/004 |
| 11,352,216 | B2 * | 6/2022 | Reischl | B65G 19/025 |
| 11,753,249 | B2 * | 9/2023 | Stauber | B65G 17/485 198/678.1 |
| 2018/0086563 | A1 | 3/2018 | Janzen et al. | |
| 2019/0291968 | A1 | 9/2019 | Gallati et al. | |
| 2021/0039890 | A1 | 2/2021 | Schneuing | |
| 2022/0048711 | A1 | 2/2022 | Kriechbaum et al. | |

FOREIGN PATENT DOCUMENTS

| | | |
|---|---|---|
| DE | 102004018569 B4 | 6/2016 |
| DE | 202016008366 U1 | 9/2017 |
| DE | 102017201919 A1 | 8/2018 |
| DE | 102018201541 A1 | 8/2019 |
| EP | 2130968 B1 | 9/2010 |
| EP | 2418160 B1 | 7/2013 |
| EP | 2708478 B1 | 11/2014 |
| EP | 3782936 A1 | 2/2021 |
| WO | WVO 2018/078098 A1 | 5/2018 |

OTHER PUBLICATIONS

International Preliminary Report on Patentability for corresponding International Application No. PCT/EP2022/064644, mailed Dec. 14, 2023.
Office Action (Including Translation) for corresponding European Application No. 22731176.8, mailed Apr. 12, 2023.
International Search Report for corresponding International Application No. PCT/EP2022/064644, mailed Sep. 14, 2022.
Witten Opinion for corresponding International Application No. PCT/EP2022/064644, mailed Sep. 14, 2022.
Intention to Grant (Including Translation of Allowed Claims) corresponding European Application No. 22731176.8, mailed Nov. 20, 2023.

* cited by examiner

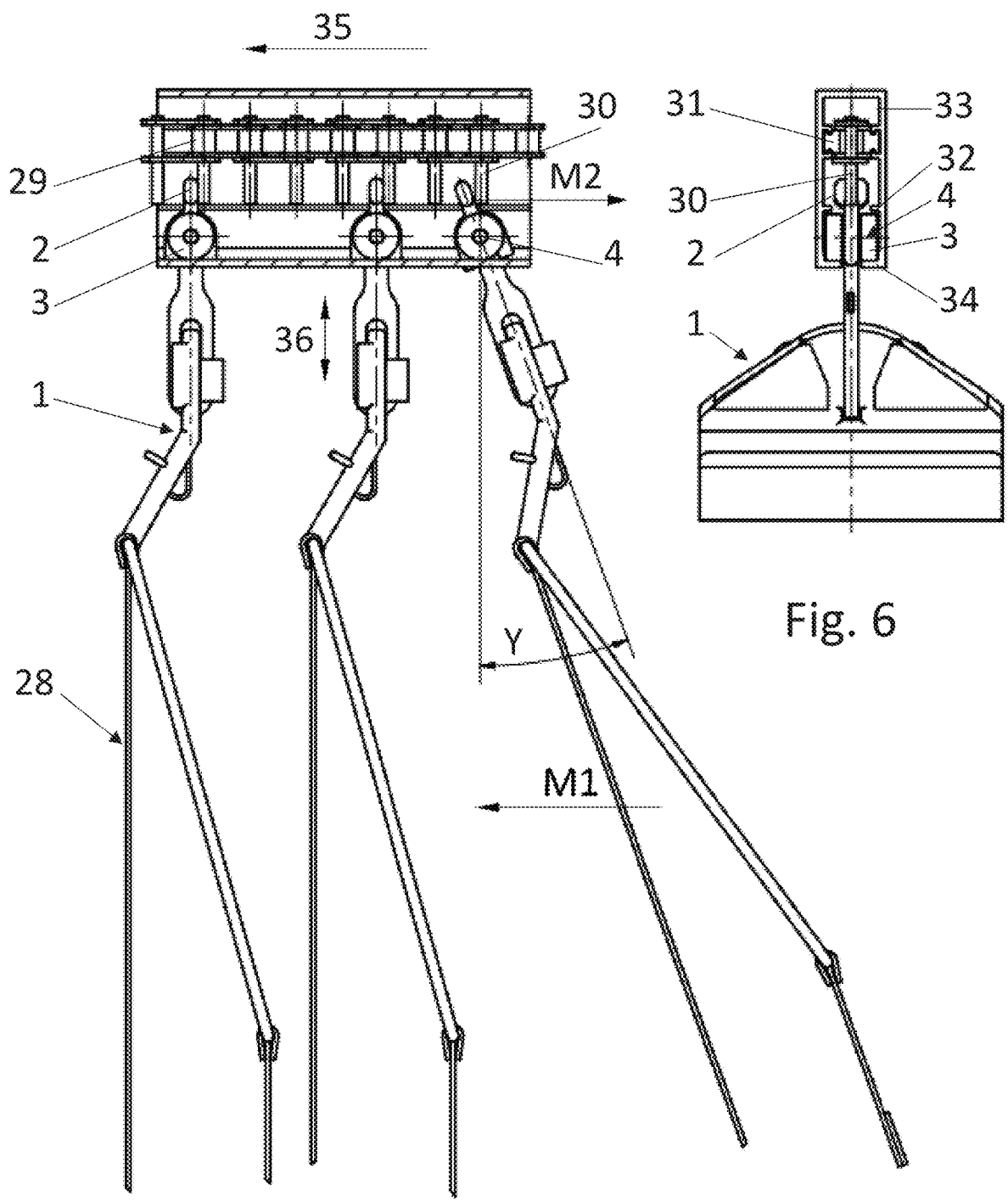

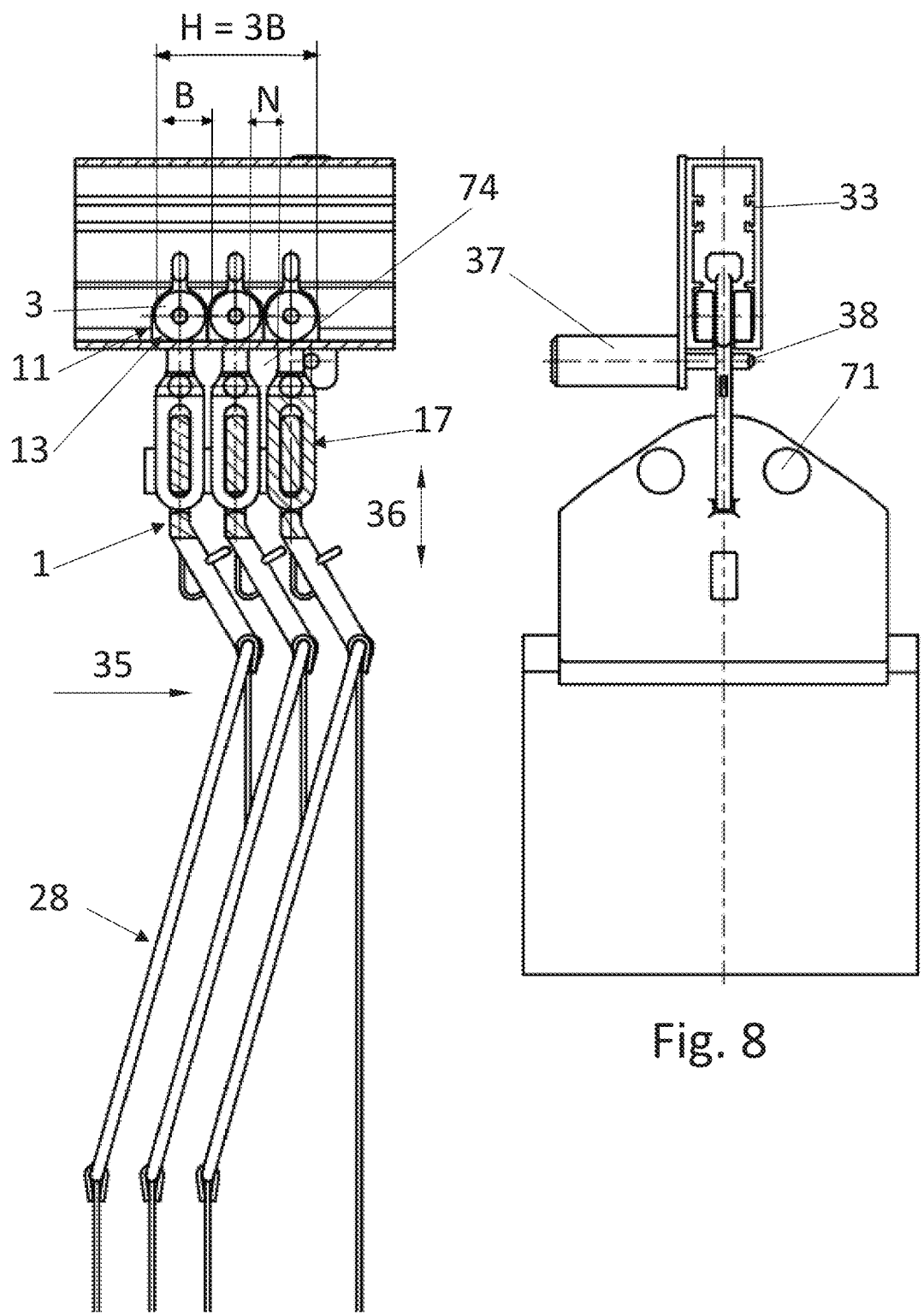

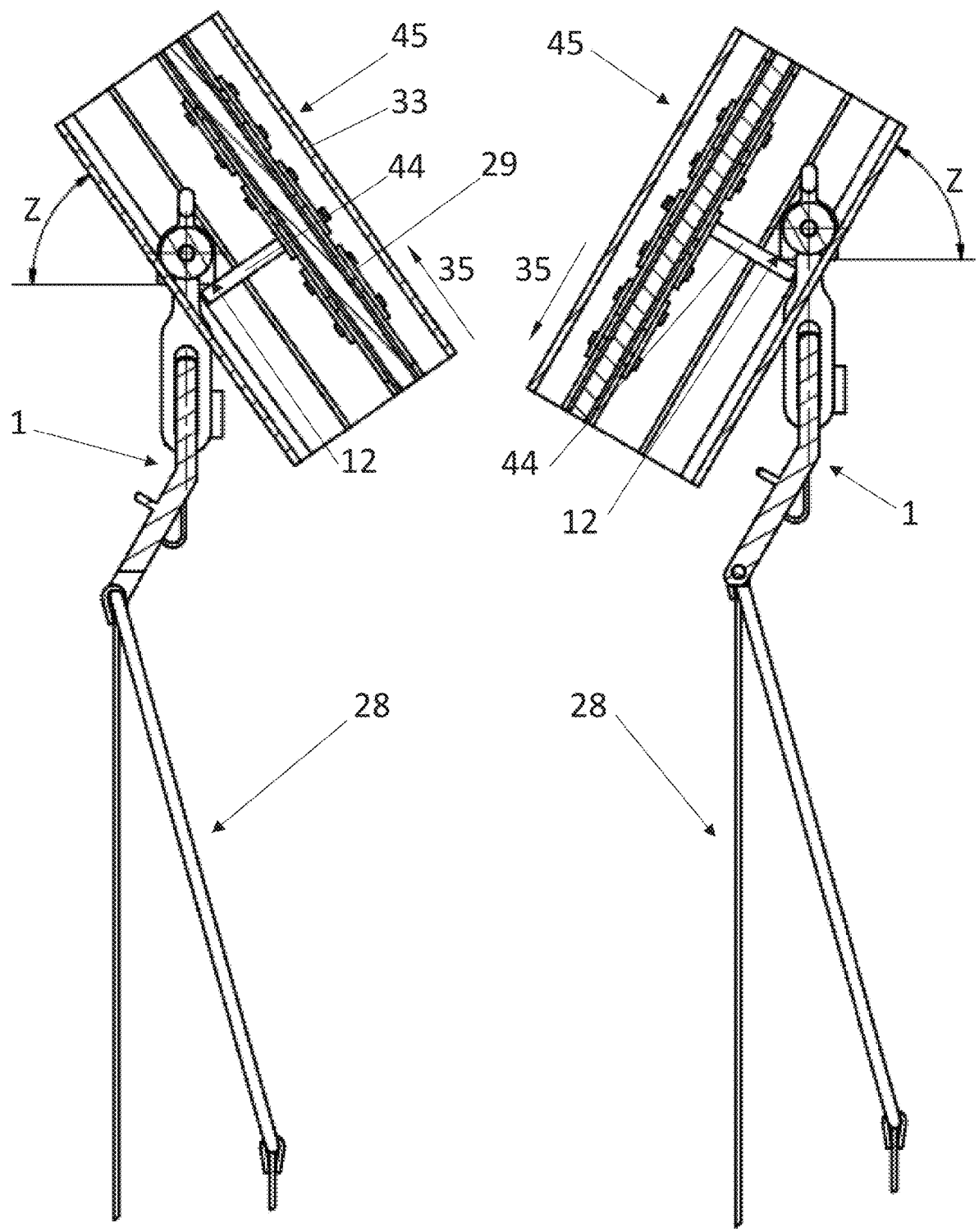

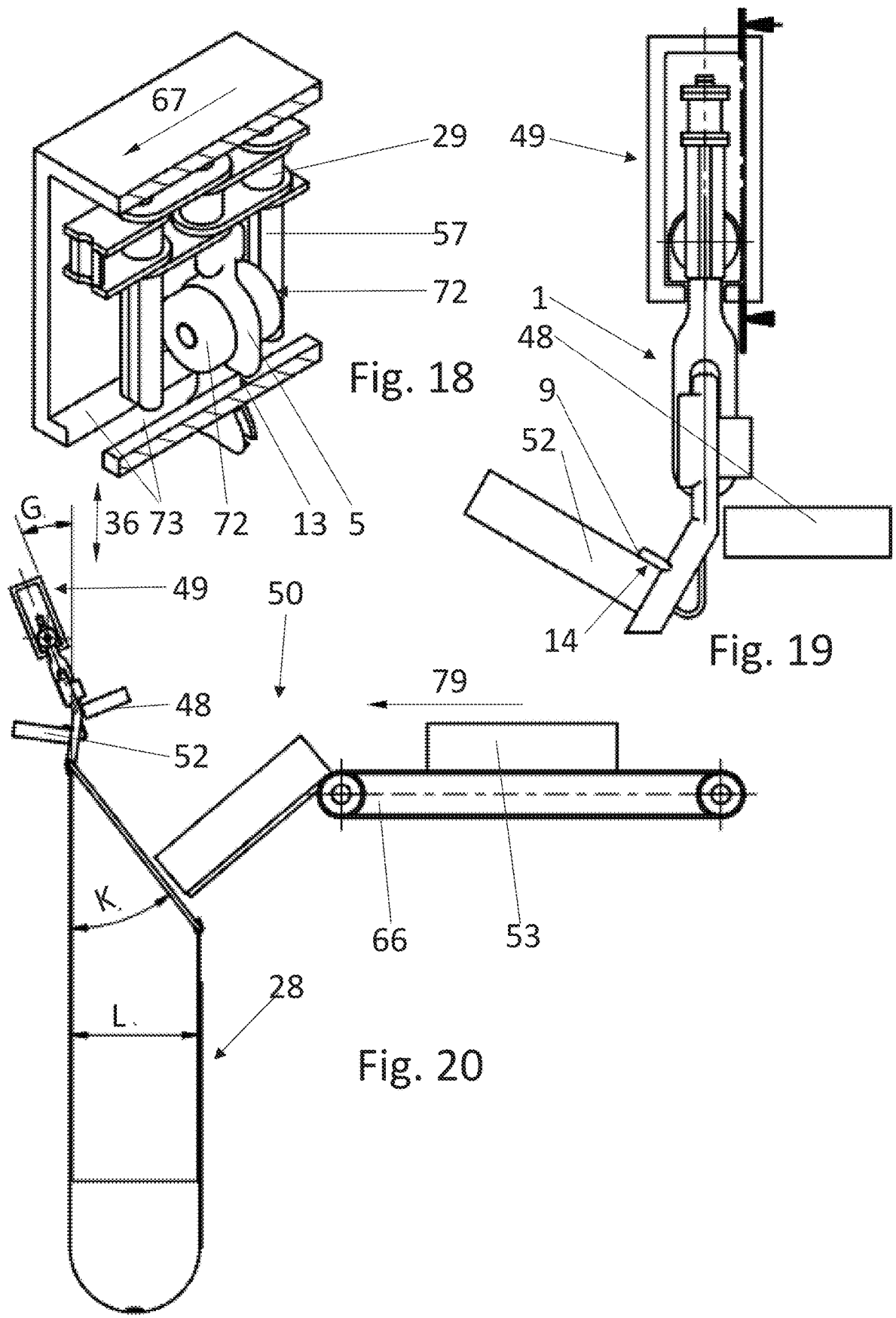

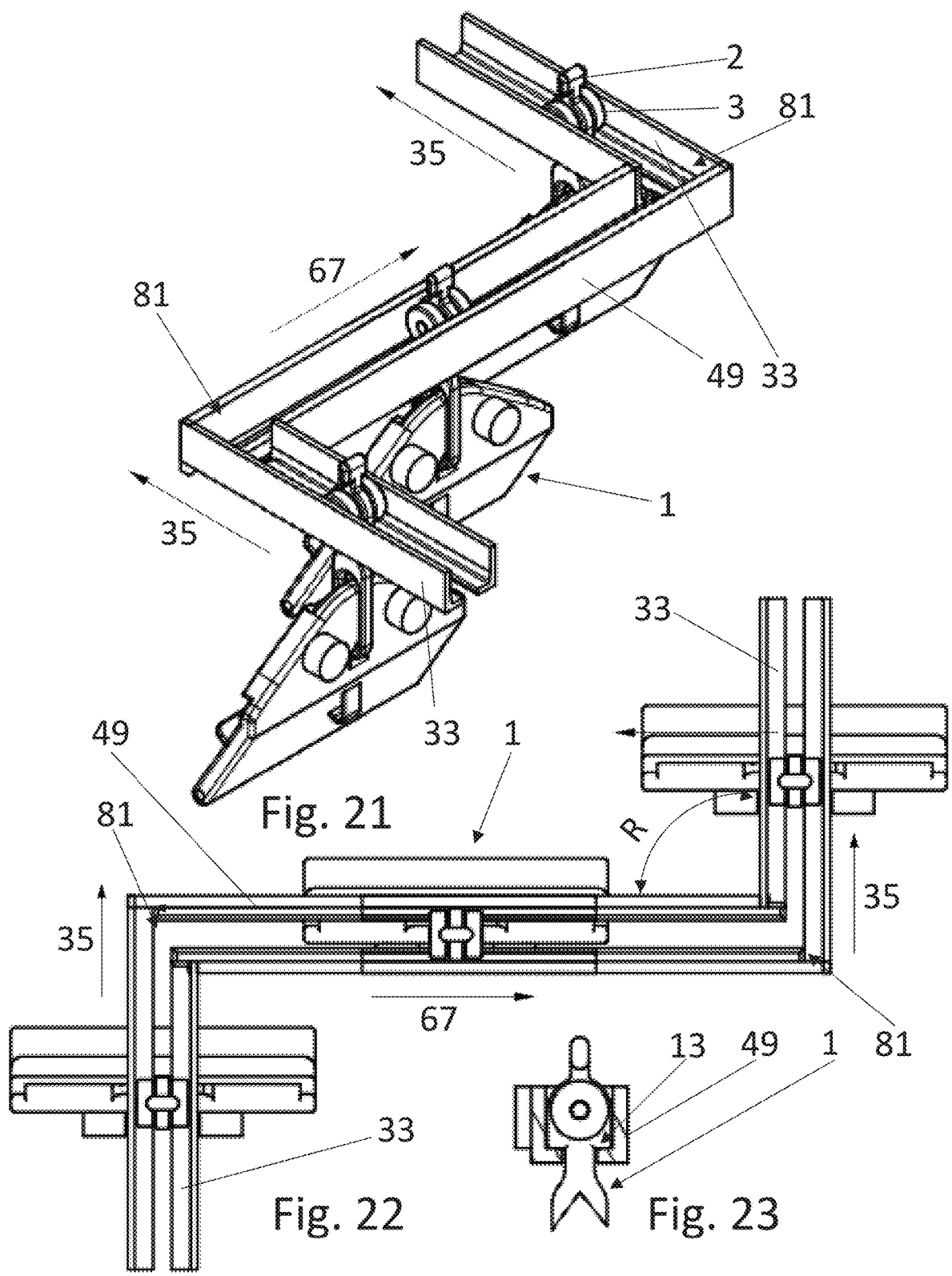

TRANSPORT BAG FOR SUSPENDED TRANSPORT OF MATERIAL TO BE CONVEYED, AND LOADING STATION AND CONVEYOR SYSTEM FOR THESE TRANSPORT BAGS

CROSS REFERENCE TO RELATED APPLICATIONS

This application is a national stage application under 35 U.S.C. 371 of PCT Application No. PCT/EP2022/064644 having an international filing date of 30 May 2022, which designated the United States, which PCT application claimed the benefit of German Application No. 10 2021 002 833.3, filed 2 Jun. 2021, each of which are incorporated herein by reference in their entirety.

The invention relates to a transport bag for the suspended transport of conveying good in accordance with the preamble of claim 1. Furthermore, the invention relates to a loading station for transport bags of this type and to a conveyor system with a loading station of this type.

DE 102004018569B4 has disclosed a conveyor system with carrying bags. The carrying bags consist of a rear wall, a front wall, side walls and a bottom, and are hooked by means of a support hook into a driver of the conveyor system. The upper edges are connected to one another by means of a rectangular support frame. In order to open a feeding opening which is delimited by way of the support frame, projections are provided which are attached to the support frame and are guided at a feeding station via a rail which moves the support frame into an approximately horizontal position, with the result that the feeding opening is opened. A disadvantage of this carrying bag is the introduction of the goods to be conveyed from the side.

EP 2130968B1 has disclosed a conveyor system, in the case of which carrying bags are hooked by means of support hooks into a driver of a conveyor system. The carrying bags have a rear wall and a front wall with a bottom which is attached to the rear wall by means of a releasable coupling. At the upper edge, the rear wall and the front wall are connected to one another by means of a rectangular support frame which has projections laterally. At a loading station, these projections run onto a rail, with the result that the support frame is swiveled upward, as a result of which a feeding opening is opened. For unloading, the lower coupling is opened, with the result that a goods item to be conveyed can fall out downward.

It is disadvantageous that the carrying bag does not have any side walls, and that the goods to be conveyed can fall out. Moreover, a highly complicated loading station is necessary, and the connection of the drivers of the conveyor system to the carrying bag is not ensured reliably.

EP 2418160B1 has disclosed a conveyor system with carrying bags for goods to be conveyed, with drivers which are moved on a conveying rail in a conveying direction for receiving the carrying bags. The goods to be conveyed can be received in a bag pouch with narrow and wide side walls, a feeding window being configured in one of the wide side walls. The carrying bag can be adjusted by means of a coupling from a stable rotational position with a closed feeding window situated transversely with respect to the conveying direction into an unstable rotational position with the closed feeding window situated parallel to the conveying direction, into an open state into an unstable rotational position with the feeding window situated parallel to the conveying direction, and unimpaired handling of the goods to be conveyed in order to load or empty the carrying bag is made possible.

DE 10 2011101 987A1 has disclosed a transport bag for conveying a goods item to be conveyed in a conveyor system, with a carrier part which is configured for receiving on a conveying track of the conveyor system, with a loading aid for receiving the goods to be conveyed, the loading aid having a closure flap which has a handling tab with a clamping portion, the carrier part having a clamping device with a clamping lever which can be moved between a holding position, in which a holding force acts on the clamping portion, and a release position, and the clamping lever being coupled to the clamping portion in the holding position in such a way that the received goods to be conveyed bring about an increase in the holding force by way of their weight. The complicated loading and closing of the transport bag are disadvantageous. Moreover, the transport bag can fall out of the conveyor system during swinging.

EP 2 708478B1 has disclosed a transport bag for a suspended conveyor apparatus for the suspended transport of objects, having a holding frame, a bag pouch which hangs on the holding frame and by which objects to be transported can be received, and a suspension element which is connected to the holding frame and by means of which the carrying bag can be hooked onto the suspended conveyor apparatus, in order to be transported in a hanging manner by the suspended conveyor apparatus, and the bag pouch has a first and a second pouch portion which each have a first pouch end portion which is connected to the holding frame and a second pouch end portion which faces away from the holding frame, the second pouch end portions being connected to one another via a joint mechanism which can be moved into an unloading position, in which the second pouch end portions are arranged at a spacing from one another, with the result that the bag pouch is for dispensing objects by way of an outlet opening formed between the two pouch end portions, and which can be moved into a loading position, in which the second pouch end portions are arranged adjacently with respect to one another, with the result that the outlet opening is closed and the bag pouch can receive objects. The complicated loading and unloading of the transport bag are disadvantageous. Moreover, the transport bag can fall out of the conveyor system during swinging.

The known transport bags for the suspended transport and the conveyor systems for the transport bags require complicated loading stations, are not sufficiently energy-efficient, are partially loud and are equipped with a large number of additional safety systems, in order to avoid operating failures.

The invention is based on the object of developing the transport bag of the generic type and the conveyor system for the transport bag in such a way that a low-wear transport bag and conveyor system for the transport bag which are matched to one another exactly, are energy-efficient, operationally reliable, low-noise and constructed with few parts arise for loading, sorting, unloading, backing up and storing the transport bag.

According to the invention, this object is achieved by way of the features in the characterizing part of claim 1 and the subclaims. The transport bag comprises a roller chassis with only one pair of rollers, on which it is supported in the transport rail in a swinging manner. The upper coupling of the transport bag is situated above the rollers, which coupling makes the drive and transport by way of a conveying element possible which preferably has a commercially available roller chain with driver pins. The disengagement of the drivers and upper coupling parts is prevented by way of the construction of the transport bag, by the transport bag generating a sufficient torque about the roller axle, and the permissible tilting of the upper coupling with respect to the vertical not being exceeded during the transport on the conveying path, so that more secure driving of the transport bag is ensured by way of a simpler, less expensive roller chain. The arc-angle switches for the conveyor system are of operationally reliable construction with few parts. Further advantages result from the lower coupling, by way of which reliable transport on gradients of up to 65° can be ensured. The sliding surfaces of the roller chassis make sharp transverse conveying of 90° out of the rolling movement into the sliding movement and a compact and efficient construction of the loading station possible. The joint connection of the base body and the holding plate of the roller chassis relieves the forces arising during braking or accelerating as a consequence of the dynamic axial displacements, with the result that, as a consequence, the rotation and swinging movement of the transport bag are not transmitted to the base body and the rollers and therefore long-term low-wear operation can be made possible.

Further features, advantages and details of the invention result from the following description of embodiments and examples on the basis of the drawings, in which.

Figures 9, 10:
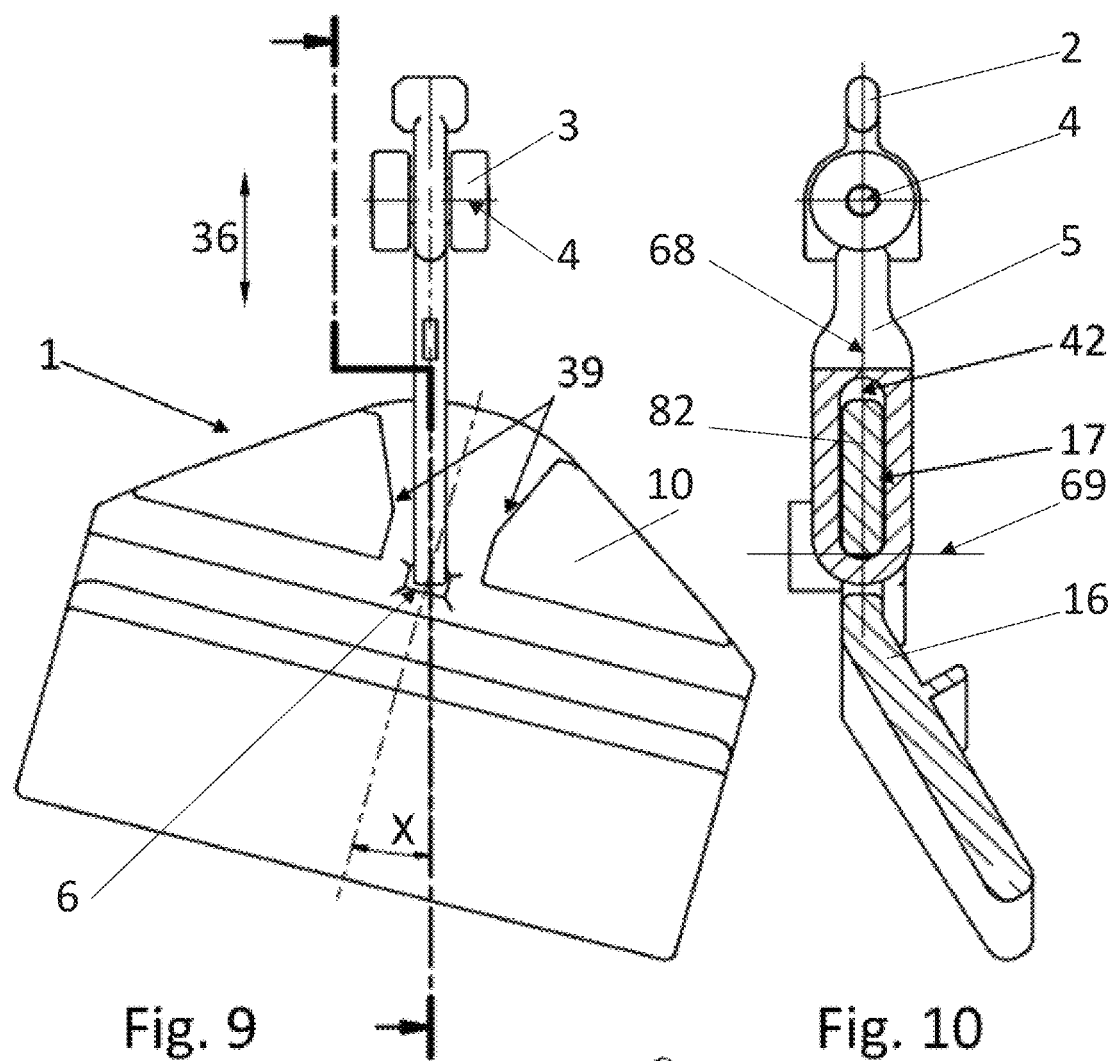
Figure 11:
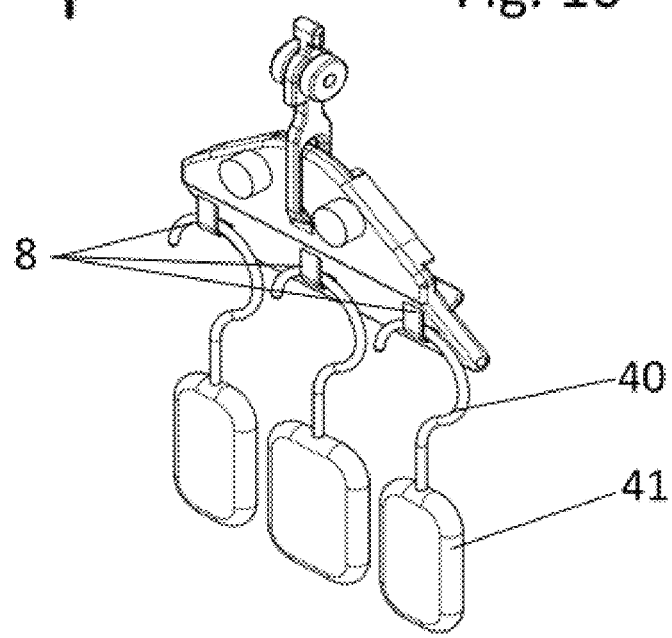
Figure 12:
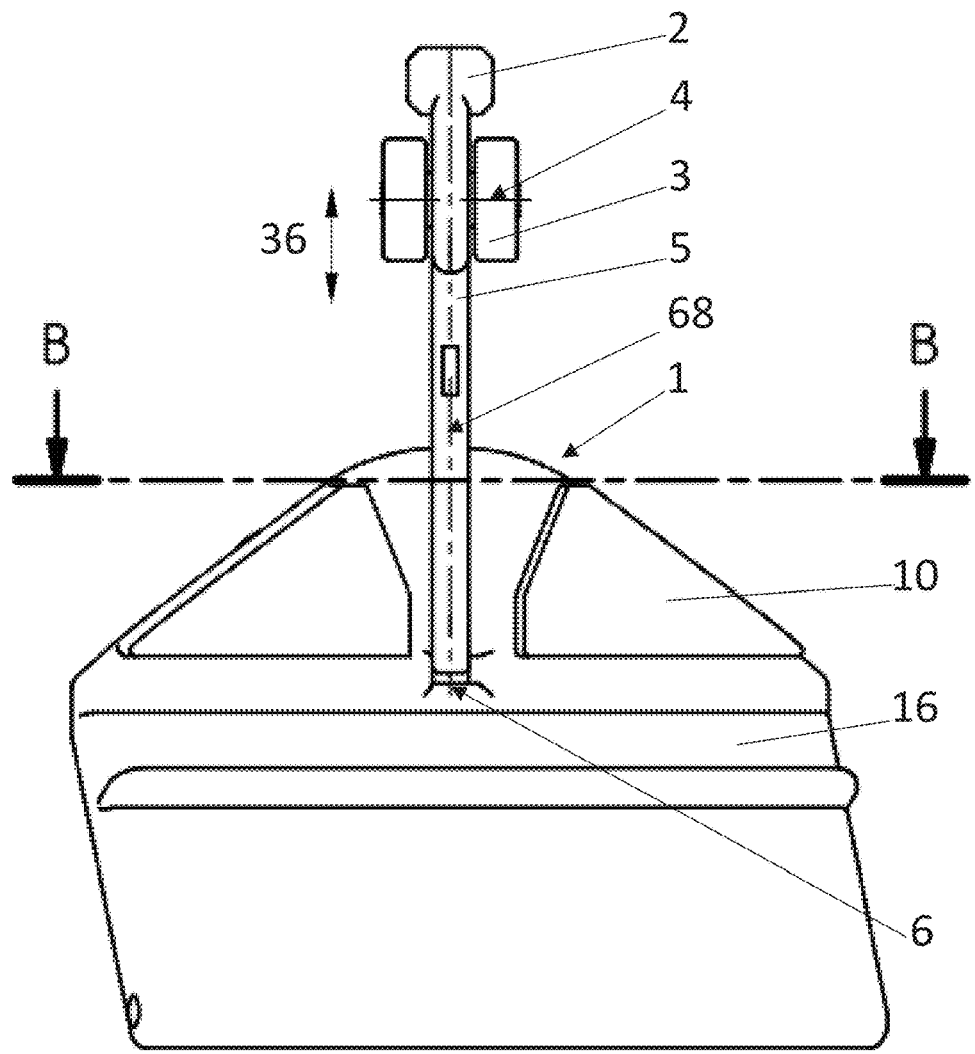
Figure 13:
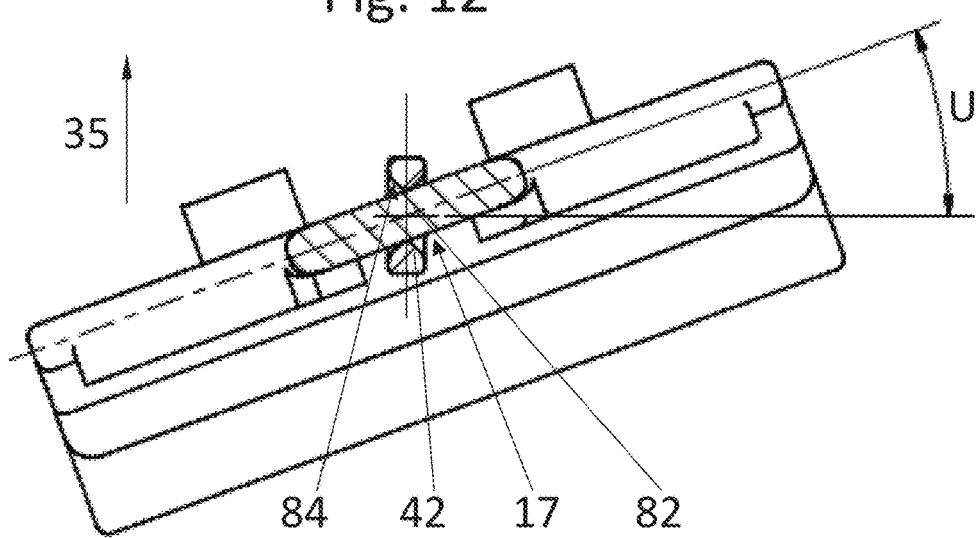
Figure 16:
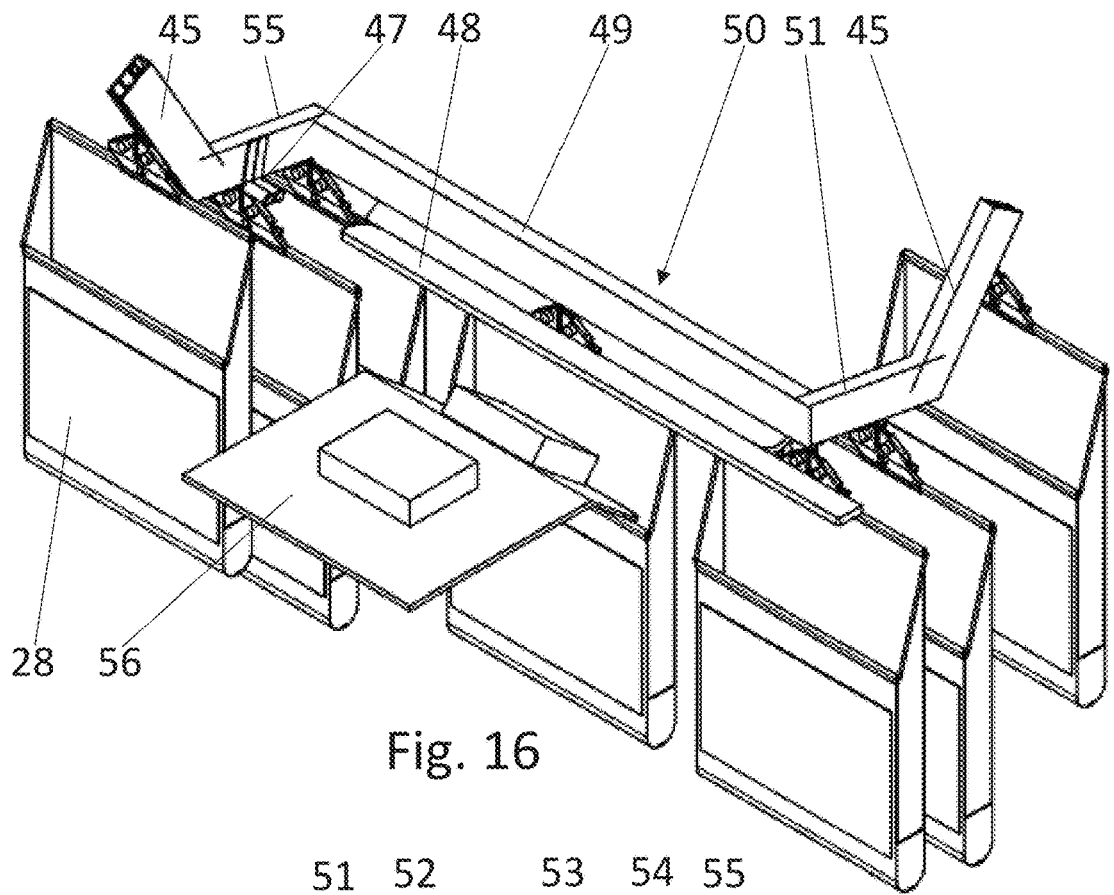
Figure 17:
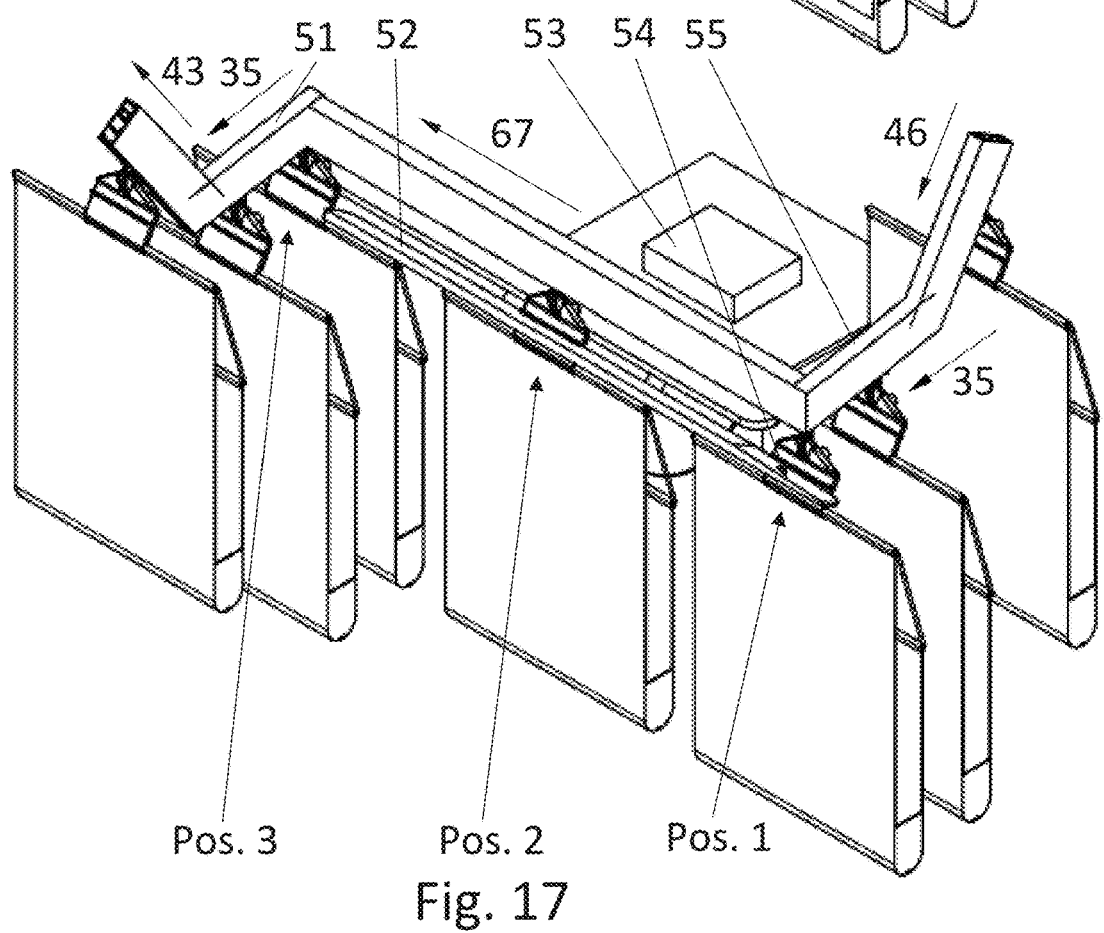
Figure 25:
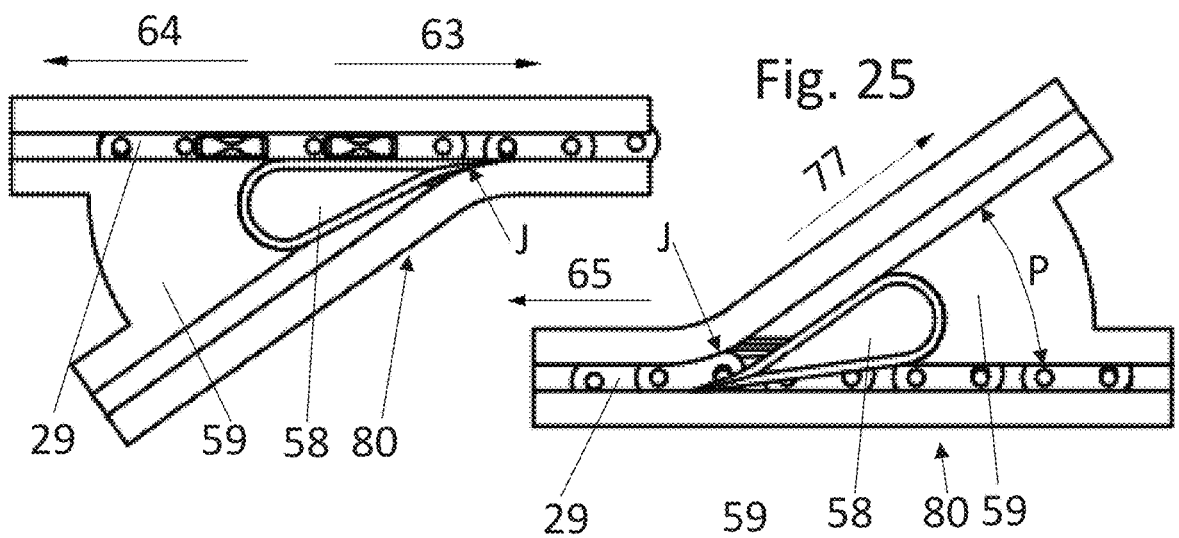
Figure 26:
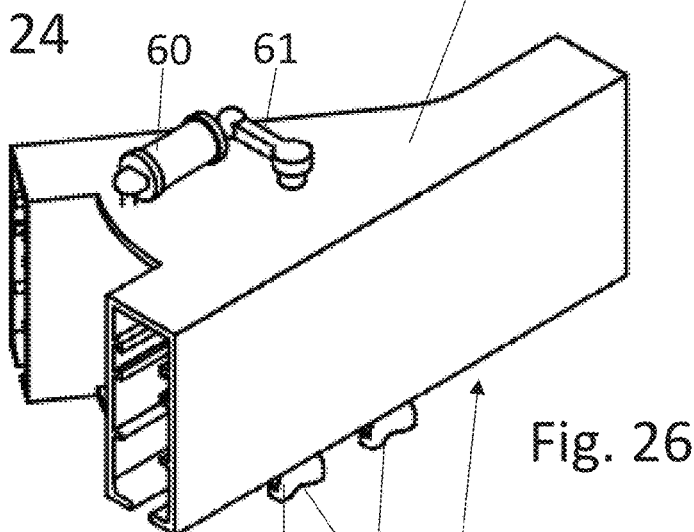
Figure 27:
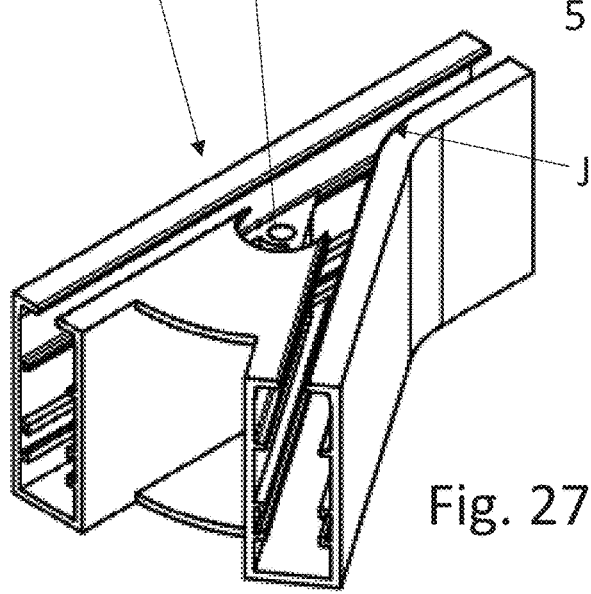
Figure 28:
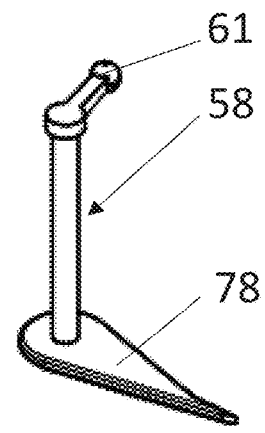

FIG. 5 shows a side view of the transport bags in the conveyor system with a conveying element, FIG. 6 shows a front view of a fragment of the transport bag in the conveyor system with a conveying element, FIG. 7 shows a side view of the empty transport bags in the conveyor system on an accumulating path with a stopper, FIG. 8 shows a front view of a fragment of the transport bag in the conveyor system on an accumulating path with a stopper, FIG. 9 shows a frontal view of the roller chassis with the holding plate when suspended, FIG. 10 shows a sectioned side view of the roller chassis with the holding plate when suspended, FIG. 11 shows a perspective rear view of the roller chassis with the objects which are hooked in, FIG. 12 shows a front view of the roller chassis with the holding plate in a rotational movement, FIG. 13 shows a sectioned plan view of the roller chassis with the holding plate in a rotational movement, FIG. 14 shows a sectioned side view of the transport bags in the inclined conveyor when moving upward, FIG. 15 shows a sectioned side view of the transport bags in the inclined conveyor when moving downward, FIG. 16 shows a perspective front view of the loading station with the transport bags, FIG. 17 shows a perspective rear view of the loading station with the transport bags, FIG. 18 shows a perspective sectioned side view of the transverse conveying of the transport bags, FIG. 19 shows a frontal view of the transverse conveying of the transport bag, FIG. 20 shows a side view of the loading station with a transport belt, FIG. 21 shows a perspective front view of the transverse transport switches for the transport bags, FIG. 22 shows a perspective plan view of the transverse transport switches for the transport bags, FIG. 23 shows a sectioned front view of the transverse conveying of the transport bag on the sliding surfaces, FIG. 24 shows a bottom view of the arc angle switch for the transport bags with the switch tongue switched into a linear state, FIG. 25 shows a bottom view of the arc angle switch for the transport bags with the switch tongue switched into the arc angle state, FIG. 26 shows a perspective side view of the arc angle switch for the transport bags, FIG. 27 shows a perspective side view of the base body of the arc angle switch, and FIG. 28 shows a perspective side view of the switch tongue.

Figure 1:
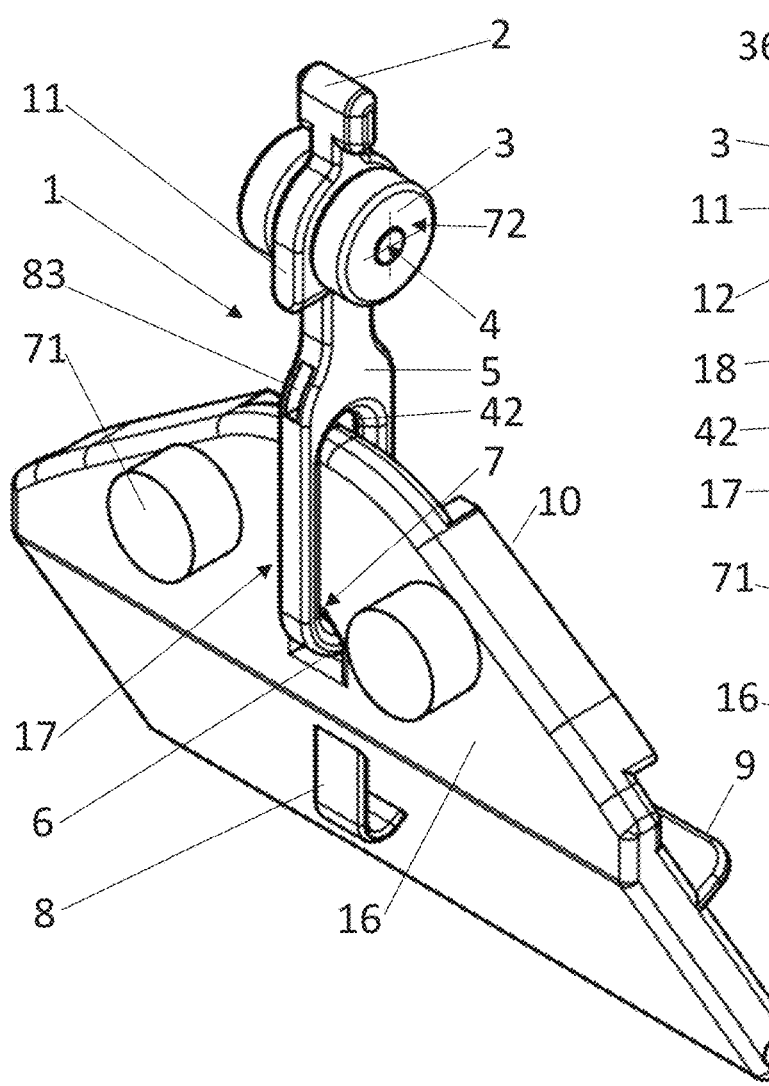
FIG. 1 shows a perspective rear view of the roller chassis.
Figure 2:
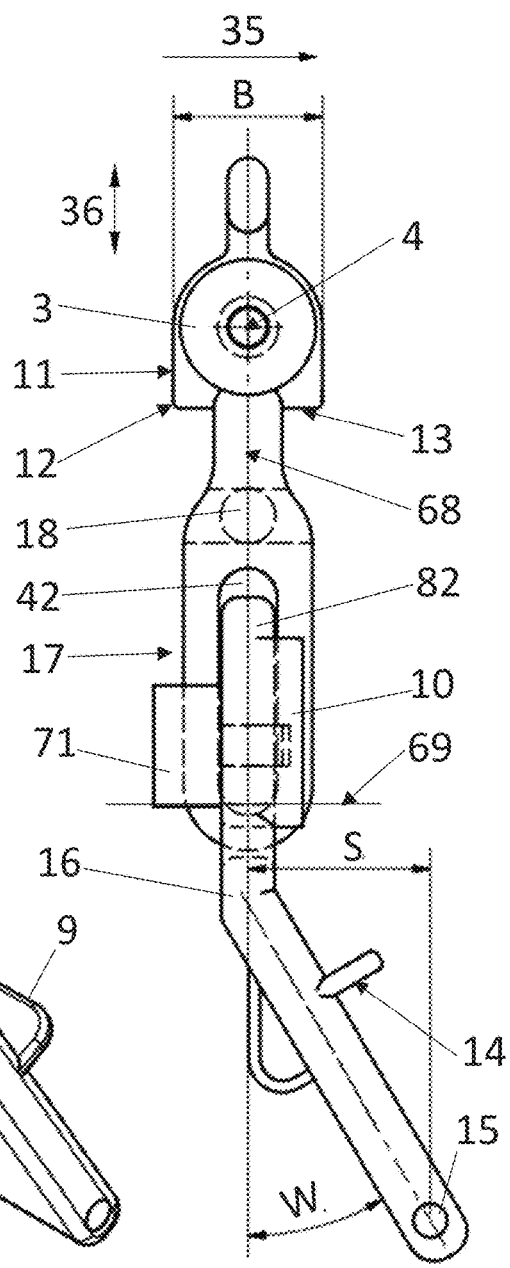
FIG. 2 shows a side view of the roller chassis.

FIGS. 1 and 2 show a roller chassis 1 which comprises only two rollers 3, on which it is mounted in the transport rail 33 in a suspended manner (FIG. 5). The roller chassis 1 comprises a base body 5 with the rollers 3 which are installed in the upper region, and a holding plate 16 with fastening means 15 for the loading frame 19. Above the rollers 3, the base body 5 has an upper coupling 2 for the transmission of the drive force (FIG. 5) of the drivers 30 of the conveying element 29. The base body 5 and the holding plate 16 are connected to a technical joint 17. The technical joint 17 is formed with the joint socket 42 in a slot form in the base body 5 which engages around the joint element 82, formed by the eyelet 6, of the holding plate 16. The technical joint 17 comprises rotational and swiveling axles 68 and 69. The technical joint 17 does not comprise a rotational and swiveling axle along the plane through the axle 4 and 68, with the result that, during swinging of the roller chassis 1 about the axle 4, the base body 5 and the holding plate 16 act essentially as if connected fixedly, and a maximum possible torque is generated by way of the dead weight of the roller chassis 1 during swinging about the axle 4. The base body 5 comprises sliding surfaces 13 for transverse transport at a sharp angle with respect to the rolling movement, and lower couplings 12 for the transport on gradients of up to at least 65°. The holding plate 16 is of angle-like configuration in the direction 35, and has an angle W with respect to the plane through the axle 4 and 68 of from 10° to 45°, preferably of from 25° to 35°. The holding plate 16 comprises a guide 9 for transverse transport in the loading station 50, noise insulation means (71) and stop surfaces 10 for the noise insulation means (71). The base body 5 and the holding plate 16 preferably consist of plastic, particularly preferably of carbon fiber reinforced polyamide, and the rollers 3 are preferably low-friction ball bearings with a bandage made from plastic which is preferably POM. A data carrier 18 which is preferably a writable chip is situated in the base body 5 in the socket 83.

Figures 3, 4:
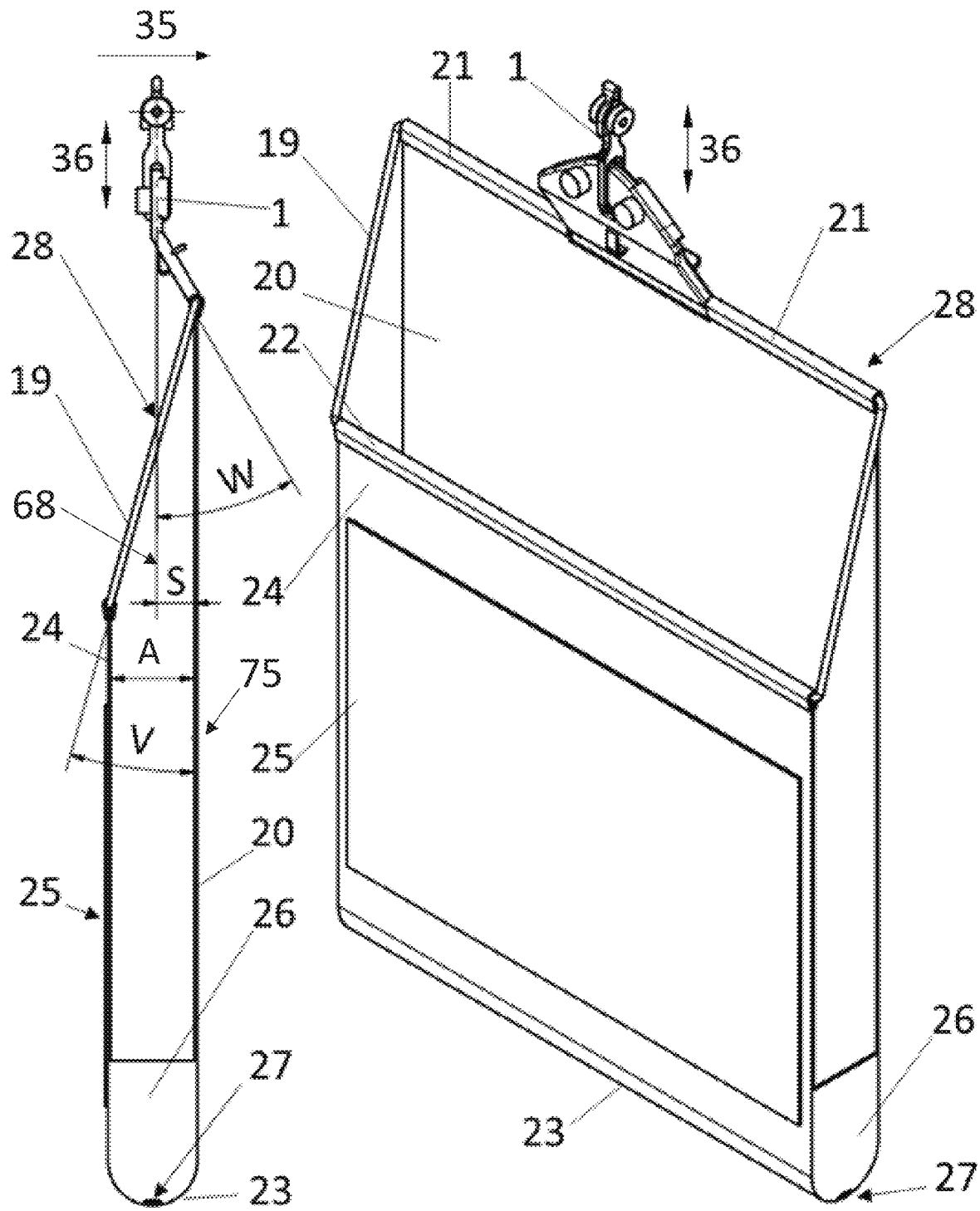
FIG. 3 shows a side view of the transport bag.
FIG. 4 shows a perspective rear view of the transport bag.

FIGS. 3 and 4 depict a transport bag 28, consisting of a roller chassis 1 and a loading frame 19 which is connected to the roller chassis 1. The loading frame 19 is of rectangular configuration and preferably consists of a metal wire. The loading frame 19 is installed fixedly and non-rotatably into the holding plate 19 at an angle V with respect to the base body about the plane through the axle 4 and 68 of from 5° to 45°, preferably of from 10° to 30°, particularly preferably of from 12° to 20°, and is opposed with respect to the angle W. The depth A which arises between the front wall 20 and the rear wall 24 of the transport bag 28 has substantially a dimension of 2S, with the result that the base body 5 assumes a substantially vertical 36 position, and the depth A of the transport bag 28 has a dimension of from 20 to 150 mm, preferably of from 40 to 80 mm, particularly preferably of from 55 to 70 mm, and makes manual unloading of the transport bags 28 possible. The support wall 75 which can be folded in the conveying direction 35 is fastened on the loading frame 19 with the aid of seams on the transverse rods of the loading frame 19, and the seams contain an opening dimension, sufficient for pulling onto the loading frame 19, preferably a dimension of from 20 to 50 mm. Subsequently, the seams are trimmed with protective strips (21, 22) and are thus secured against impacts. The support wall 75 consists of a front wall 20, a rear wall 24, on which a reinforcing plate 25 is fastened, a bottom wall 23, and side walls 26. The support wall 75 of the transport bag 28 is formed at least partially from flexible material; the complete support wall 75 preferably has a coating from the outside with maximum possible low coefficients of friction in order to prevent the lateral displacement of the transport bags 28 in the accumulated state. The material is flame retardant and, in particular, of halogen-free formation, withstands at least 50 000 abrasion runs, and has a colorfastness in the inner region of the support wall 75 sufficient for preventing the discoloration of the conveying good 53 which are being transported, in particular of the textiles in the case of relatively long storing of at least 30 days and temperatures of up to 50° C.

The conveyor system according to FIGS. 5 and 6 preferably has a transport rail 33 which is manufactured from aluminum and has a box-shaped and symmetrically configured cross section with conveying element guides 31, with the upper delimiting webs 32 for the rollers 3 and the running webs 34 for the roller chassis 1. The conveying element guides 31 receive a run of an endless conveying element 29 between them by way of their facing rectangular ends. The conveying element 29 can be driven in a circulating manner by means of an electric motor (not shown). The electric motor has an acceleration ramp and brake ramp for decreasing the axial displacements and the forces which arise as a result. As can be gathered from FIGS. 5 and 6, the conveying element 29 preferably has an inexpensive commercially available roller chain with joints which can swivel about the axles. On the lower side, the roller chain comprises the drivers 30 in pin form. Below the roller chain, the transport axles 28 which are driven in the direction 35 are situated in the transport rail 33. At the dynamic pressure of the drivers 30 on the upper coupling 2 as a result of the accelerating and braking of the conveying element 29, the transport bag 28 is at an angle Y which must not be exceeded, in order to ensure relatively reliable driving of the transport bag 28. This is achieved by way of the construction of the roller chassis 1 (see description, FIGS. 1 and 2), and by way of the loading frame 19 which is installed fixedly and non-rotatably, as a result of which the transport bag 28 generates a substantially greater torque M1, in comparison with the drive torque M2, about the axle 4, in order to prevent the maximum permissible tilt (Y) of the upper coupling (2) with respect to the vertical (36) and the disengaging of the drivers (30) of the conveying element (29) and the upper clutches (2) of the roller chassis (1) being exceeded, with the result that relatively reliable driving of the transport bag 28 arises.

FIGS. 7 and 8 show a conveyor system during backing up of the empty transport bags 28. The transport bags 28 are stopped by way of a stopper 37 or by way of a separation 47 according to FIG. 16, and move together, these transport bags 28 folding in the conveying direction 35 and thus producing the maximum density with respect to one another with an overall depth H. In the roller region 11, the roller chassis 1 has a dimension B greater than the roller diameter, preferably of from 0.5 to 3 mm, particularly preferably of from 1.5 to 2 mm, and the dimension B forms substantially the maximum depth of an empty transport bag 28 which is folded in the conveying direction 35; preferably it is greater, with the result that the overall depth during backing up of the empty transport bags 28 does not exceed a dimension of H=B×number of the transport bags 28. The width N below the sliding surfaces 13 forms an opening 74, sufficient for a stopping element 38 of the separation 47 or stopper 37 to protrude through, in order to sort the empty or loaded transport bags 28.

FIGS. 9 and 10 show the roller chassis 1 during swinging about the axle 69 of the technical joint 17. The base body 5 and the holding plate 16 are connected to a technical joint 17, with the result that the holding plate 16 can swing about the axle 69 by an angle X in the base body 5 and thus prevents the transmission of the dynamic forces arising during transport to the base body 5 and, in particular, to the rollers 3. At the same time, the stability of the roller chassis 1 is maintained during swinging about the axle 4, and the transport back 28 generates a maximum possible torque M1. The stops 39 are provided to limit the angle X.

By way of the eyelets 8, as shown in FIG. 11, there is the possibility if required for additional objects 41 or data carriers to be conveyed with the transport bag 28 by way of a hook 40.

FIGS. 12 and 13 show the roller chassis 1, during the rotational movement about the axle 68 which arises during braking or accelerating as a consequence of the dynamic axial displacements. In order to relieve these forces and to avoid the transmission to the base body 5 and, in particular, to the rollers 3, the edges of the joint socket 42 are beveled or rounded, and the holding plate 16 with the joint element 82 can rotate about the axle 69 at an angle U and can thus prevent the transmission of the dynamic forces which arise during the transport to the base body 5 and the rollers 3. At the same time, the rotational movement of the holding plate 16 is limited by way of the stops 84 of the base body 5 to a rotational angle U of from 10° to 45°, preferably of from 15° to 35°. In the rest state, the holding plate 16 hangs substantially perpendicularly with respect to the conveying direction 35, by sliding with the angle-shaped (according to FIG. 1) depression 7 of the eyelet 6 into the joint socket 42 under its own weight. At the same time, the stability of the roller chassis 1 is maintained during swinging about the axle 4.

FIGS. 14 and 15 show inclined conveyors 45 for moving the transport bags 28 up and down in the case of gradients outside the maximum permissible tilt Y of the upper coupling 2, at an angle Z of up to at least 65° with the drive to the lower coupling 12 with the aid of the gradient drivers 44. The inclined conveyor 45 has a transport rail 33 with a box-shaped and symmetrically configured cross section with conveying element guides 31, with the upper limit webs 32 for the rollers 3 and running webs 34 for the roller chassis 1. The conveying element guides 31 receive a run of an endless conveying element 29. The conveying element 29 can be driven in a circulating manner by means of an electric motor (not shown) and preferably has an inexpensive commercially available roller chain with gradient drivers 44 which preferably have a wide driver surface. Below the drive chain, the transport bags 28 which are driven upward in the direction 35 are situated in the transport rail 33, and the braked transport bags 28 are situated downward in the direction 46.

FIGS. 16 and 17 depict the loading station 50. The loading station 50 serves to set up and position the transport bags 28 on the loading table 56. The transport bags 28 are preferably delivered by way of an inclined conveyor 45 in the direction 46 onto the descent path 55 with the separation 47, from which the transport bags 28 are moved in a separated manner onto the conveyor 49 arranged transversely with respect to the conveying direction 35 into a sliding movement in the conveying direction 67 on the sliding surfaces 13 of the roller chassis 1 with the aid of lateral drivers 57 on the sliding webs 73 according to FIG. 18. Continuous conveying of the transport bags 28 is provided with the exception of the time for loading the transport bags 28 with the conveying good 53. During the transverse transport in the conveyor 49, at least one transport bag 28, preferably three, is provided at the same time in the following assignment: position 1—start position of the empty transport bag 28 out of the rolling movement into the sliding movement following the descent path 55 into the conveyor 49 in the conveying direction 67, position 2—loading position upstream of the manual loading table 56 or, according to FIG. 20, upstream the transport belt 66 and loading of the transport bag 28 with conveying good 53, position 3—start position of the loaded transport bag 28 out of the sliding movement into the rolling movement in the conveying direction 35 into the descent path 51, with preferably following transport away using an inclined conveyor 45 in the direction 43. Below the conveyor 49, according to FIGS. 16-20, the bar 52 is situated for orienting the loading frame 19 to an angle K with the aid of the holding plate 16 and the guide 9. In position 1, the bar 52 has a chamfer 54 for fixing the guide 9 with the sliding surface 14 during receiving. In addition, a bar 48 is preferably provided for reliably guiding the transport bag 28 during the transverse transport. According to FIG. 20, in position 2, the angle K of the loading frame 19 is opened, in the region of loading with the conveying good 53, to a dimension of from 20° to 55°, preferably of from 30° to 45°, particularly preferably of from 35° to 40°. This takes place by way of the angled positioning of the conveyor 49 including the bars 52, 48 to an angle G with respect to the vertical 36.

FIGS. 21 to 23 depict transverse transport switches 81 for sharp changing of the conveying direction 35 to an angle of from 70° to 110°, preferably of from 85° to 95°, particularly preferably to 90° in the direction 67 out of the rolling movement into the sliding movement and conversely out of the sliding movement into the rolling movement.

The transport rail 33 is connected at a preferably 90° angle to the transport rail 67 with the sliding webs 73 according to FIG. 18.

In the angle region, the transport is transferred from the rollers 3 to the sliding surfaces 13 of the roller chassis 1. The drive takes place with the aid of the conveying element 29 with lateral drivers 57 on the lateral coupling 72 of the roller chassis 1.

FIGS. 24 to 28 show the arc angle switch 80 with an angular distribution P of the transport paths of from 20° to 45°, preferably of from 30° to 40° with a radius transition J in the angle region. The arc angle switch 80 consists substantially of a base body 59, a switchable switch tongue 58 which is installed in the bearing 62 and has a tip 78 for inserting or removing transport bags 28 in the conveying directions 65, 77, 63, 64, and a drive 60 for switching over the conveying direction. The switchover in the conveying direction 64, 77 counter to the switch tongue tip 78 takes place by way of the drive 60, and takes place in the direction 63, 65 preferably by the base body 5 in the case of driven transport of the roller chassis 1 of the transport bag 28.

The angled side of the switch 80 comprises a dedicated drive system (not shown here) which preferably has a transmission drive from the conveying element 29 and runs substantially at the same speed as the conveying element 29. The switching of the driven arc angle switch 80 is preferably controlled at least partially additionally by the roller chassis 1 for safety reasons, with the result that its position is queried by way of sensors (not shown here) before the switching. Sensors and assembly windows (not shown here) are provided in order to avoid damage and relatively long operational failures of the conveyor system, in order to stop the conveyor system in the case of incorrect switching operations of the arc angle switches 80 and with options for rapid repair if required.

The invention claimed is:

1. A transport bag for a conveyor system for receiving conveying good,
    a support wall, which has a front wall, a rear wall, side walls and a bottom wall, and
    a loading frame which is connected to a support wall and has an upper feeding opening of the support wall for arranging the front wall spaced apart from the rear wall,
    wherein the transport bag has a roller chassis,
    wherein the roller chassis comprises only two rollers in an upper region, on which the roller chassis is supportable in a swinging manner in a transport rail,
    wherein, above the rollers, the roller chassis has an upper coupling for transmission of a drive force by a conveying element,
    wherein the loading frame is attached to the roller chassis, wherein the roller chassis consists of at least one base body and a holding plate for the loading frame,
    wherein the base body and the holding plate are connected to one another with the aid of a technical joint, and
    wherein the technical joint is formed by way of a joint socket in the base body and a joint element of the holding plate, wherein the technical joint includes a rotational axle and a swiveling axle,
    the technical joint not having any swiveling axle along a plane through the axle of the rollers and the rotational axle, so that, in the case of swinging of the roller chassis about the axle of the rollers, the base body and the holding plate act substantially as if connected fixedly, and a maximum possible torque about the axle of the rollers is generated by dead weight and length of the roller chassis.

2. The transport bag as claimed in claim 1, wherein the transport bag generates, during acceleration and deceleration of the transport bag, a substantially greater torque about the axle of the rollers, in comparison with a drive torque, in order to prevent exceeding of a maximum permissible tilt of the upper coupling with respect to the vertical and disengaging of a driver of the conveying element and the upper couplings of the roller chassis so that reliable carry along of the transport bag arises.

3. The transport bag as claimed in claim 1, wherein
    the roller chassis with the technical joint has the rotational axle, so that the holding plate can swing in the base body and thus prevents, during transport, transmission of the arising dynamic forces to the base body and the rollers, and
    the roller chassis with the technical joint has the swiveling axle, so that the holding plate is enabled to carry out a rotational movement in the base body and thus prevents, during transport, the transmission of the arising dynamic forces which to the base body and the rollers, the holding plate hanging substantially perpendicularly with respect to a conveying direction in the rest state, the holding plate sliding a depression of an eyelet of the holding plate under its own weight into the joint socket.

4. The transport bag as claimed in claim 1, wherein the base body of the roller chassis has sliding surfaces below the rollers for changing conveying direction from a rolling movement transversely and sharply to 70° to 110° into a sliding movement and conversely for changing the conveying direction from the sliding movement transversely and sharply into the rolling movement.

5. The transport bag as claimed in claim 1, wherein the base body of the roller chassis has a lower coupling on both sides below the rollers for transport on conveying paths with gradients, relative to a horizontal position, at a steep angle Z of up to at least 65°.

6. The transport bag as claimed in claim 5, wherein a width below sliding surfaces of the roller chassis, when the transport bags are backed up, has an opening sufficient for a stopping element of a separation, or stopper, to protrude through for sorting the transport bags.

7. The transport bag as claimed in claim 1, wherein the loading frame and the holding plate of the roller chassis are connected fixedly and non-rotatably at an angle V with respect to the plane through the axle of the rollers and the rotational axle of 5° to 45°.

8. The transport bag as claimed in claim 1, wherein the holding plate is formed angle-like with respect to the plane through the axle of the rollers and the rotational axle at an angle W of 10° to 45°.

9. The transport bag as claimed in claim 7, wherein the angle V of the loading frame is formed oppositely to an angle W of the holding plate, and
wherein an arising depth between the front wall and the rear wall of the transport bag contains substantially a dimension of 2S, so that the base body assumes a substantially vertical position, and
wherein the depth of the transport pocket has a dimension of 20 to 150 mm, and allows manual unloading of the transport bags.

10. The transport bag as claimed in claim 1, wherein at least one of applies:
data carrier is provided in the roller chassis;
sound insulation means are contained in the roller chassis for low-noise operation;
the roller chassis has at least one eyelet for driving objects;
the holding plate has stops in order to limit a swinging angle X in the base body to 5° to 35°;
the rotational movement of the holding plate is delimited by way of stops of the base body to a rotational angle of 10° to 45°;
the holding plate of the roller chassis has a guide with a sliding surface for aligning the transport bag during transverse transport on the sliding surfaces; and
the support wall of the transport bag is foldable in a conveying direction and is formed at least partially from flexible fabric.

11. A conveyor system including
a transport rail,
a conveying element supported movably in a conveying direction in the transport rail with drivers, and
with at least one transport bag, which is supported in the transport rail below the conveying element;
wherein the at least one transport bag comprises:

a support wall, which has a front wall, a rear wall, side walls and a bottom wall, and
a loading frame which is connected to a support wall and has an upper feeding opening of the support wall for arranging the front wall spaced apart from the rear wall,
wherein the transport bag has a roller chassis,
wherein the roller chassis comprises only two rollers in an upper region, on which the roller chassis is supportable in a swinging manner in a transport rail,
wherein, above the rollers, the roller chassis has an upper coupling for transmission of a drive force by a conveying element,
wherein the loading frame is attached to the roller chassis, wherein the roller chassis consists of at least one base body and a holding plate for the loading frame,
wherein the base body and the holding plate are connected to one another with the aid of a technical joint, and
wherein the technical joint is formed by way of a joint socket in the base body and a joint element of the holding plate, wherein the technical joint includes a rotational axle and a swiveling axle, the technical joint not having any swiveling axle along a plane through the axle of the rollers and the rotational axle, so that, in the case of swinging of the roller chassis about the axle of the rollers, the base body and the holding plate act substantially as if connected fixedly, and a maximum possible torque about the axle of the rollers is generated by dead weight and length of the roller chassis.

12. The conveyor system as claimed in claim 11 further comprising at least one of:
an inclined conveyor for conveying the at least one transport bag in the case of gradients at an angle of up to at least 65° with a drive to the lower coupling of the main body with the aid of a gradient driver;
accumulating paths with separation and a stopper;
an arc-angle switch with transport rails which are connected at an angle laterally to the transport rail in order to insert or remove the at least one transport bag;
a transverse-transport switch for sharp changing of the conveying direction from rolling movement into sliding movement, so that the transport is transferred from the rollers onto sliding surfaces of the roller chassis (1);
a loading station; and
a station for the at least one transport bag in a loaded state for unloading a conveying good.

13. A loading station including an inclined conveyor, a descent path with a separation for releasing backed up empty transport bags, a conveyor which is arranged transversely with respect to a conveying direction, a loading table for transporting a conveying good manually or by way of a transport belt into a transport bag, and a descent path, wherein
in order to set up and position the transport bags on the loading table or the transport belt, the transport bags are transferred out of rolling movement in the descent path following the conveyor which is arranged transversely with respect to the conveying direction into a sliding movement in a conveying direction on sliding surfaces of the rolling chassis with the aid of a conveying element, and
continuous conveying of the transport bags is provided with the exception of the stop time for loading the transport bags with the conveying good, and
during transverse transport, at the least one transport bag is provided in the conveyor in the following assignment: position 1 which is a start position of an empty transport bag out of the rolling movement into the sliding movement following the descent path into the conveyor in the conveying direction, position 2 which is a loading position upstream of the loading table, or the transport belt, and loading of the least one transport bag with the conveying good, and a position 3 which is a start position of the at least one transport bag, which is in loaded state, out of the sliding movement into the rolling movement in the conveying direction into the descent path, in that a bar is provided below the conveyor for aligning the transport bags with the aid of the guide of the respective holding plate and at the same time opening of the respective loading frame to an angle K, and in that in the loading position the conveyor including the bar is aligned to an angle G in order to produce the angle K of the loading frame greater than the angle V, and in that the angle K has a dimension of 20° to 55°.

* * * * *